United States Patent Office 3,836,603
Patented Sept. 17, 1974

3,836,603
PROCESS FOR PREPARING PARA-XYLENE
James E. Connor, Jr., Wynnewood, Robert W. Rieve, Springfield, and Harold Shalit, Drexel Hill, Pa., assignors to Atlantic Richfield Company
No Drawing. Filed Mar. 29, 1973, Ser. No. 346,227
Int. Cl. C07c 5/26
U.S. Cl. 260—673.5                     9 Claims

ABSTRACT OF THE DISCLOSURE

Method for the conversion of isobutane to para-zylene wherein the isobutane is thermally oxidized with molecular oxygen to produce an oxidate which is predominantly a mixture of tertiary butyl hydroperoxide and tertiary butyl alcohol. The oxidate is employed as the oxidizing agent together with a catalyst such as a molybdenum catalyst in the epoxidation of an olefin such as propylene to produce the olefin oxide and reduce the tertiary butyl hydroperoxide to tertiary butyl alcohol. The total tertiary butyl alcohol stream or any portion thereof is dehydrated preferably over alumina to isobutylene which is then thermally dimerized to produce trimethylcyclopentanes, or alternatively the tertiary butyl alcohol is passed directly into the dimerization zone wherein it is dehydrated and dimerized to the trimethylcyclopentanes which in turn are aromatized to para-xylene by passing them over a chromia-alumina catalyst which has high selectivities for the aromatic.

BACKGROUND OF THE INVENTION

There have been many methods proposed over the years to convert alkanes to aromatics in multiple or even single stage processes. A recent U.S. Pat. No. 3,644,550 shows that a mixture of particles of bismuth oxide and chromia-alumina can be used to convert isobutane or a mixture of isobutane and isobutylene to para-xylene with good conversions and selectivities. The amount of bismuth oxide for a commercial plant in accordance with this patent, however, is very large, approaching or exceeding current annual production of this relatively scarce bismuth oxide compound.

It is also known that isobutane can be dehydrogenated to isobutylene either thermally or catalytically but such processes are uneconomic because of poor conversions or poor selectivities or both. The by-products from such reactions require complex separation methods to recover those having a value other than fuel value.

It is also known to dehydrodimerize isobutylene using agents such as bismuth oxide or similar oxides to produce dimethylhexadienes which can be dehydrocyclized to para-xylene. Such a process is not always completely economical because of the scarcity and cost of the bismuth oxide agent but also unless extremely close control is maintained there will be produced compounds which can neither be recycled nor converted to the desired aromatic.

Relatively pure para-xylene can be made from isobutylene by first dimerizing it over an acid catalyst, such as sulfuric acid to give trimethylpentenes. These olefins are then aromatized over a chromia-alumina catalyst to give essentially para-xylene, as set forth in U.S. Pat. 3,202,725. The yield of para-xylene per-pass in the aromatization step is low because of the ease with which the trimethylpentenes crack back to isobutylene under the reaction conditions. This requires that a large recycle stream of isobutylene be sent back to the acid dimerization step.

Alternative approaches have also been proposed wherein the isobutylene is thermally dimerized and the product is passed over a commercial reforming catalyst, e.g. platinum on activated alumina types, to produce a mixture of benzene, toluene, the xylenes and ethyl benzene.

It is apparent that none of the foregoing methods are commercially attractive, consequently, currently the major source of low molecular weight aromatics and, in particular, xylenes is extraction from catalytic reformate which is produced in petroleum refining to make high octane gasoline. The removal of this fraction from the reformate for chemical uses seriously impairs the octane value of the reformate. Reformate may contain from 20 percent to 30 percent of $C_6$ to $C_8$ aromatics. Because of the overlapping boiling points of these aromatics with other hydrocarbon types present in the reformate, the aromatics can only be removed in high purity by a selective extraction. Such processes are complicated and costly. When para-xylene is the desired aromatic from the reformate, the extraction process must be followed by a multi-stage fractional crystallization at low temperatures to recover a pure para-xylene fraction. Again, this is a complicated and costly step. Some newer technology for the purification of para-xylene from its mixtures with other $C_8$ aromatics involves the use of molecular sieves as selective absorbents. This scheme may represent an improvement, but is still quite costly. A major problem in each of these separation schemes for para-xylene is that the para-xylene isomer of the three possible xylenes is only present to about 20 percent of the mixture of equilibrium. This causes large volumes of undesired material to be passed through the process to recover the minor amounts of para-xylene present.

The present invention provides an integrated process wherein the problems of the prior art multiple stage processes are either entirely obviated or minimized and additional economies are realized by utilization of certain steps to produce other valuable chemicals as will be described in detail hereinafter.

SUMMARY OF THE INVENTION

In accordance with this invention para-xylene is produced from isobutane by a series of reactions involving first the thermal oxidation of isobutane to tertiary butyl hydroperoxide and tertiary butyl alcohol, reduction of the hydroperoxide by catalytic epoxidation of an olefin to give the olefin oxide and the alcohol, catalytic dehydration of all or any part of the tertiary butyl alcohol stream to isobutylene and thermal dimerization of the isobutylene or thermal dehydration and dimerization followed by catalytic aromatization of the dimerization product to para-xylene.

It is an object of this invention, therefore, to provide a method for the production of para-xylene from isobutane.

It is another object of this invention to provide a method for the production of para-xylene from isobutane wherein an additional valuable chemical is produced.

It is another object of this invention to provide a method for the production of para-xylene from isobutane which avoids the use of scarce compounds as catalysts or reactants.

Other objects of this invention will be apparent from the description of the invention which follows and from the claims.

DESCRIPTION OF THE INVENTION

In recent years there has been developed and used a thermal method for the oxidation of isobutane with molecular oxygen to produce a mixture of tertiary butyl hydroperoxide and tertiary butyl alcohol.

In general these plants run at conversions ranging from 20 to 35 weight percent with the unoxidized isobutane being recycled. Reaction temperatures range from 200°–250° F. to 300° F. with pressures preferably in the range of from 400 p.s.i. to 500 p.s.i. The oxidized product, in general, ranges from 90–95 weight percent of a mixture of tertiary butyl hydroperoxide-tertiary butyl alcohol with about a 60:40 weight ratio. The other products generally are only about 1 percent each of water, methanol, acetone, acids and esters, none of which are detrimental in the instant invention. If desired the selectivity for tertiary butyl alcohol can be increased by the addition of a few parts per million of metal ions such as molybdenum ions.

The oxidate composed primarily of the tertiary butyl hydroperoxide and tertiary butyl alcohol is used as the oxidizing agent mixture in a catalyzed olefin epoxidation process. There are such plants that have been in operation for several years which employ a molybdenum catalyst and propylene as the olefin. In general these plants operate at moderate temperatures 270°–300° F. and pressures of from 550 p.s.i. to 700 p.s.i. with a molybdenum concentration of 200 to 800 p.p.m. in the reactor. The conditions for such plants have been described both in the patent and technical literature. The tertiary butyl alcohol is used as a solvent or diluent in the reaction and after the tertiary butyl hydroperoxide has been reduced to the tertiary butyl alcohol, the unreacted olefin, olefin oxide and heavy bottoms are separated, leaving a relatively pure tertiary butyl alcohol stream.

This alcohol stream can then be dehydrated catalytically over an alumina catalyst in accordance with known technology to produce high purity isobutylene. In general the catalytic dehydration step involves passing the tertiary butyl alcohol over a commercial alumina dehydration catalyst in an adiabatic reactor with an inlet temperature of about 700° F. and an exit temperature of about 500° F. A convenient pressure is about 80 p.s.i.a. and a weight hourly space velocity of 3.

The isobutylene thus produced is thermally dimerized at temperatures in the range of from 700° F. to 1000° F., preferably 750° F. to 850° F., under pressures in the range of from 1000 p.s.i.g. to 5000 p.s.i.g., preferably from 2000 p.s.i.g. to 3000 p.s.i.g. and with reaction times ranging from 0.5 to 30 minutes, preferably from 1.0 to 10 minutes. The reaction time is greatly dependent on the temperature and pressure chosen. The dimerization reactor can be an empty tube or one packed with an inert heat transfer medium such as: tubular alumina, mullite, glass, silicon carbide, ceramics, pumice or the like. Under these conditions the primary products are the trimethylcyclopentanes which for convenience hereinafter will be designated by the abbreviation "TMCP."

Alternatively the tertiary butyl alcohol stream can be charged directly to the thermal dimerization reactor wherein under the above described conditions it is first thermally dehydrated to isobutylene which in turn is dimerized to the desired TMCP. The alternative route eliminates the separate catalytic dehydration step and is preferred if all of the tertiary butyl alcohol is to be converted to para-xylene.

The TMCP from the dimerization step is easily concentrated, if desired, by simple distillation to 80 weight percent purity or higher giving a fraction having a boiling range from about 100° to 110° C.

The TMCP either as produced from the thermal dimerization step or purified as described is then aromatized over a substantially non-acidic chromia-alumina catalyst at temperatures in the range of 800° F. to 1100° F. preferably 900° F. to 1000° F. Atmospheric pressures are preferred, neither subatmospheric nor superatmospheric pressures are particularly beneficial. An inert gas such as nitrogen or a reducing gas such as hydrogen can be employed as a diluent to control contact time. Times ranging from 0.5 to 5 seconds can be used with from 1 to 2.5 seconds being preferred.

The chromia-alumina catalyst for use in this invention can be any neutral or basic chromia-alumina catalyst, available commercially, produced by conventional manufacturing methods and having conventional composition. In general, chromia-alumina catalysts can be prepared by treating preformed alumina particles with a solution of a chromia compound and, thereafter, the impregnated particles are pelleted, dried, and calcined to produce the desired chromia-alumina catalyst. Although chromia-alumina compositions containing from about 10 to about 25 mole percent chromia can be used, the preferred chromia-alumina catalysts are those containing from about 17 to 18 mole percent chromia since such catalyst has the optimum activity. Some commercial chromia-alumina catalysts are manufactured to be relatively free of acid sites, however, other commercial catalysts require neutralization of the acid sites.

Acid sites are well-known to catalyze coking and cracking of hydrocarbons and they may also promote burning reactions. It has been found that if the chromia-alumina catalyst containing acid sites is treated with a dilute, e.g. 1 weight percent, aqueous solution of a base, sodium hydroxide, preferably, for a number of hours, for example, about 16 hours such that the catalyst is completely penetrated by the hydroxide, the acid sites are substantially completely neutralized. The catalyst is washed thereafter until the wash water has a pH of 7 showing that neutrality has been achieved and any excess hydroxide has been removed.

The Examples which follow are provided to illustrate the invention in further detail but are not to be construed as limiting.

EXAMPLE I

Isobutylene such as obtained by the dehydration of tertiary butyl alcohol was dimerized in a continuous flow reactor with tabular alumina as a heat transfer medium. The thermal dimerization conditions and products are given in Table I. Isobutylene was employed instead of tertiary butyl alcohol in this Example to give a direct comparison with prior art methods shown in Example II. When tertiary butyle alcohol is charged to the thermal dimerization reactor essentially the same results are obtained as shown.

TABLE I

| Run number | 1 | 2 | 3 | 4 | 5 | 6 |
|---|---|---|---|---|---|---|
| Temperature, ° F | 804 | 795 | 797 | 748 | 855 | 895 |
| Pressure, p.s.i.g | 2,000 | 2,000 | 1,500 | 2,000 | 2,500 | 2,000 |
| Contact time (minutes) | 10 | 20 | 10 | 10 | 2.5 | 10 |
| Conversion isobutene, wt. percent | 74.6 | 83.9 | 36.2 | 11.9 | 70.0 | 88.1 |
| Selectivity to TMCP (percent wt.) | 61.0 | 60.3 | 62.0 | 46.8 | 55.0 | 45.5 |

NOTE.—Selectivity = $\dfrac{\text{Wt. percent TMCP in product}}{\text{Wt. percent conversion of iC}_4}\times 100$.

Runs 1 and 2 show that maximum conversion of isobutylene is achieved at contact times of between 10 and 20 minutes at 800° F. and 2000 p.s.i.g. Selectivity to TMCP is not changed over this range of contact time. Run 3 shows that lowering of the pressure to 1500 p.s.i.g. reduces conversion of isobutylene, but does not lower the selectivity to TMCP. Run 4 shows that lowering the temperature of 748° F. greatly reduces both conversion and selectivity. Run 5 shows that short contact times can be accommodated by suitable increase in temperature and pressure to maintain conversion and selectivity at a relatively high level. Run 6 shows that excessive temperature will lower selectivity to TMCP even though isobutylene conversion is increased.

EXAMPLE II (Comparative)

A series of runs similar to those in Example I were made using isobutylene mixed with other olefins to simulate a feed stock produced by the pyrolysis of isobutane. All procedures were the same. The data are given in Table II.

TABLE II

| Run number | 1 | 2 |
|---|---|---|
| Feed (percent volume): | | |
| Isobutylene | 83.0 | 75.0 |
| Propylene | 13.0 | 16.7 |
| Ethylene | | 8.3 |
| Temperature, °F | 790 | 800 |
| Pressure, p.s.i.g | 2,000 | 2,000 |
| Contact time (minutes) | 20 | 20 |
| Conversion isobutene, percent | 70.2 | 78.0 |
| Selectivity to TMCP (wt. percent) | 53.6 | 49.4 |

These results show that by using isobutylene free of other olefins (Example I) improved conversions and selectivities are obtained, i.e. compare these runs with Run 2 of Example I. Moreover the pyrolysis reaction for the production of isobutylene from isobutane not only gives a lower yield of isobutylene but also produces by-products other than olefins which are of little use. On the other hand the oxidation, epoxidation, dehydration route for the production of isobutylene from isobutane not only gives a higher over-all yield but also gives a net advantage in producing a highly useful and valuable product such as propylene oxide.

A possible alternative route for the production of para-xylene is by the aromatization of TMCP over a commercial noble metal catalyst used in naphtha reforming. The following example demonstrates such a method.

EXAMPLE III (Comparative)

A TMCP fraction, from the dimerization of isobutylene as described in Example I, containing about 96 percent TMCP was aromatized over a commercial reforming catalyst consisting of 0.35 percent platinum on activated alumina. The reaction conditions and products are set forth in Table III.

TABLE III

| Run number | 1 | 2 | 3 | 4 |
|---|---|---|---|---|
| Temperature, °F | 825 | 850 | 875 | 850 |
| Pressure, p.s.i.g | 200 | 200 | 200 | 500 |
| L.H.S.V. (cc./cc./hr.) | 1.0 | 1.0 | 1.0 | 1.0 |
| $H_2$:HC molar | 5 | 5 | 10 | 5 |
| Conversion TMCP (wt. percent) | 99.6 | 100.0 | 100.0 | 97.9 |
| Selectivity to aromatization (wt. percent) | 56.6 | 60.8 | 60.8 | 36.0 |
| Yield, wt. percent TMCP: | | | | |
| Benzene | 0.2 | 0.2 | 0.2 | 0.3 |
| Toluene | 4.5 | 6.4 | 6.4 | 6.5 |
| Xylenes | 51.1 | 53.5 | 53.1 | 37.0 |
| Ethyl benzene | 0.5 | 1.1 | 1.1 | 1.5 |

These data show that the TMCP is converted in large part to mixed aromatics at temperatures between 825 and 875° F. at 200 p.s.i.g. pressure. At higher pressure (500 p.s.i.g.) the hydrogenation equilibrium favors non-aromatic products. The xylenes formed from this reaction are a mixture of three isomers essentially at the thermodynamic equilibrium of 24.7 percent ortho-xylene, 52.2 percent meta-xylene and 23.1 percent para-xylene at 850° F.

Thus this route is subject to all of the disadvantages currently encountered in obtaining para-xylene from petroleum catalytic reformates discussed hereinbefore.

The following Example utilizes the aromatization method of this invention.

EXAMPLE IV

An isobutylene dimerization product was fractionated to give a product boiling between 100° C. and 110° C. and containing about 80 percent TMCP. This was passed at one atmosphere total pressure over a commercial chroma-alumina catalyst containing between 17 and 18 weight percent chromia and which was substantially free of acid sites. The residence time (contact time) in the reactor was controlled by adding either hydrogen or nitrogen gas to dilute the TMCP vapors. The hydrogen gas has an additional advantage in that it helps to control carbon deposits on the catalyst. Other conditions and the products are given in Table IV.

TABLE IV

| Run number | 1 | 2 | 3 |
|---|---|---|---|
| Temperature, °F | 943 | 947 | 952 |
| Contact time (second) | 1.3 | 1.3 | 2.6 |
| Diluent gas | $N_2$ | $H_2$ | $H_2$ |
| Conversion TMCP (wt. percent) | 16.5 | 15.2 | 24.3 |
| Selectivity to xylenes | 59.3 | 61.0 | 61.7 |
| Wt. percent p-xylene in xylene fraction | 84.7 | 80.7 | 72.7 |

These data show that TMCP gives high yields of para-xylene when aromatized over catalysts such as chromia alumina. Either an inert gas such as nitrogen, or a reducing gas such as hydrogen can be used as a diluent to control contact time. Hydrogen may also serve to reduce catalyst deposits. Because of the high selectivity to para-xylene, recovery and purification methods are greatly simplified.

Although chromia-alumina is the most preferred catalyst other aromatization catalyst can be employed such as a calcium-nickel-phosphate catalyst, an iron oxide-chromia-potassium catalyst and the like. The chromia-alumina system can also include promoters such as zinc oxide, magnesium oxide, and cerium oxide. Basic oxides such as sodium oxide, potassium oxide, calcium oxide and the like may be used to improve the chromia-alumina catalysts.

We claim:

1. In an integrated method for the conversion of isobutane to para-xylene by thermally oxidizing isobutane with molecular oxygen to produce an oxidate comprising predominantly a mixture of tertiary butyl hydroperoxide and tertiary butyl alcohol, contacting an olefinic compound with said oxidate in the presence of an epoxidation catalyst to epoxidize the olefinic compound and reduce the tertiary butyl hydroperoxide to tertiary butyl alcohol, the improvement which comprises subjecting said tertiary butyl alcohol to simultaneous dehydration and dimerization to produce trimethylcyclopentanes and aromatizing the trimethylcyclopentanes to para-xylene in the presence of a chromia-alumina catalyst, said catalyst having been treated with a dilute aqueous solution of sodium hydroxide, and thereafter water washing the treated catalyst to substantially completely neutralize and render the catalyst substantially free of acid sites.

2. The method according to Claim 1 wherein the dehydration and dimerization is carried out at temperatures in the range of from 700° F. to 1000° F. under pressures in the range of from 1000 p.s.i.g. to 5000 p.s.i.g. for from 0.5 to 30 minutes.

3. The method according to Claim 1 wherein the thermal dehydration and dimerization is carried out at temperatures in the range of from 750° F. to 850° F. at pressures ranging from 2000 p.s.i.g. to 3000 p.s.i.g. with reaction times ranging from 1.0 to 10 minutes.

4. The method according to Claim 1 wherein the trimethylcyclopentanes are concentrated to at least 80 weight percent and have a boiling range of from 100° C. to 110° C.

5. The method according to Claim 1 wherein the aromatization is carried out at a temperature in the range of 800° F. to 1100° F. in the presence of an inert gas to control contact time to form 0.5 to 5 seconds.

6. The method according to Claim 1 wherein the aromatization is carried out in the temperature in the range of from 900° F. to 1000° F. in the presence of an inert gas selected from the group consisting of nitrogen and hydrogen to control the contact time to from 1 to 2.5 seconds.

7. A method according to claim 1 wherein the tertiary butyl alcohol is subjected to simultaneous thermal dehydration and dimerization to produce trimethylcyclopentanes and aromatizing said trimethylcyclopentanes to para-xylene in the presence of a chromia-alumina catalyst substantially free of acid sites.

8. In an integrated method for the conversion of isobutane to para-xylene by thermally oxidizing isobutane with molecular oxygen to produce an oxidate comprising predominantly a mixture of tertiary butyl hydroperoxide and tertiary butyl alcohol, contacting an olefinic compound with said oxidate in the presence of an epoxidation catalyst to epoxidize the olefinic compound and reduce the tertiary butyl hydroperoxide to tertiary butyl alcohol, the improvement which comprises subjecting said tertiary butyl alcohol to simultaneous thermal dehydration and dimerization at temperatures in the range of 750° F. to 850° F. at pressures ranging from 2000 p.s.i.g. to 3000 p.s.i.g. with reaction times ranging from 1.0 to 10 minutes to produce trimethylcyclopentanes and aromatizing the trimethylcyclopentanes to para-xylene at temperatures in the range of from 900° F. to 1000° F. at atmospheric pressures in the presence of an inert gas to control contact time to from 1 to 2.5 seconds and in the presence of a chromia-alumina catalyst which has been treated with a 1 weight percent aqueous solution of sodium hydroxide and thereafter water washing the treated catalyst to render the catalyst substantially free of acid sites.

9. The method according to claim 8 wherein the trimethylcyclopentanes are concentrated to at least 80 weight percent and having a boiling range of from 100° C. to 110° C.

References Cited

UNITED STATES PATENTS

| 2,415,438 | 2/1947 | McKinley et al. | 260—666 R |
| 2,415,454 | 2/1947 | Whitaker | 260—666 R |
| 3,202,725 | 8/1965 | Lorz et al. | 260—673.5 |

FOREIGN PATENTS

| 888,964 | 2/1962 | Great Britain | 260—668 D |

CURTIS R. DAVIS, Primary Examiner

U.S. Cl. X.R.

260—348.5 R, 632, 666 P, 668 D, 682, 683.1